(12) United States Patent
Bresniker et al.

(10) Patent No.: US 7,363,516 B2
(45) Date of Patent: Apr. 22, 2008

(54) RACK EQUIPMENT MANAGEMENT SYSTEM AND METHOD

(75) Inventors: Kirk Michael Bresniker, Roseville, CA (US); Ricardo Espinoza-Ibarra, Lincoln, CA (US); Andrew Harvey Barr, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 544 days.

(21) Appl. No.: 10/678,657

(22) Filed: Oct. 3, 2003

(65) Prior Publication Data

US 2005/0076255 A1 Apr. 7, 2005

(51) Int. Cl.
G06F 1/00 (2006.01)
G06F 1/26 (2006.01)

(52) U.S. Cl. .................... 713/300; 713/320
(58) Field of Classification Search ............... 713/300
See application file for complete search history.

(56) References Cited

U.S. PATENT DOCUMENTS

| | | | |
|---|---|---|---|
| 4,851,965 A | 7/1989 | Gabuzda et al. | |
| 6,018,625 A | 1/2000 | Hayball et al. | |
| 6,785,592 B1 | 8/2004 | Smith et al. | |
| 6,836,849 B2* | 12/2004 | Brock et al. ............. | 713/310 |
| 6,837,063 B1 | 1/2005 | Hood, III et al. | |
| 6,976,112 B2* | 12/2005 | Franke et al. ............. | 710/302 |
| 7,051,215 B2* | 5/2006 | Zimmer et al. ............ | 713/300 |
| 2002/0049920 A1 | 4/2002 | Staiger | |
| 2004/0255171 A1 | 12/2004 | Zimmer et al. | |

FOREIGN PATENT DOCUMENTS

| | | |
|---|---|---|
| EP | 1096360 | 2/2001 |
| EP | 1182538 | 2/2002 |
| EP | 1182556 | 2/2002 |
| GB | 2342471 | 4/2000 |
| GB | 2393540 | 3/2004 |
| GB | 2404792 | 2/2005 |
| JP | 3076234 | 4/1991 |
| JP | 3076234 | 12/2000 |
| JP | 2004-283374 | 9/2007 |

* cited by examiner

*Primary Examiner*—James K. Trujillo
*Assistant Examiner*—Stefan Stoynov

(57) ABSTRACT

A rack equipment management system and method for providing a convenient and efficient manner to automatically manage rack equipment associated with information processing based upon power consumption and heat dissipation policies is presented. In one embodiment of the present invention, a rack equipment management system includes a rack equipment management policy data store, a management component, and a communication bus. The rack equipment management policy data store stores policy information related to rack equipment operations. The management component manages power consumption and thermal load of the rack equipment. The communication bus communicatively couples the rack equipment management policy data store and the management component.

13 Claims, 4 Drawing Sheets

RACK EQUIPMENT MANAGEMENT SYSTEM AND METHOD

FIELD OF THE INVENTION

The present invention relates to rack equipment management.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Frequently, electronic systems designed to provide these advantageous results are realized through the leveraged utilization of centralized resources by distributed network nodes. While leveraged utilization of centralized resources is usually advantageous, management of centralized resource operations is usually very complex and often involves significant infrastructure support coordination and maintenance.

Centralizing certain resources within a distributed network typically provides desirable benefits. For example, centrally storing and/or processing information typically relieves the necessity of wasteful duplicative storage and/or processing resources at each remote networked node. However, managing large storage and processing capabilities of centralized resources is very complex and expensive. Clients interested in engaging a host to provide centralized resources and services typically have a desire to avoid providing the infrastructure, operation and maintenance directly themselves.

Centralized computing resource centers (e.g., server farms, Application Service Provider Centers, Internet Data Centers, Utility Data Centers, etc.) usually include a variety of equipment related to information processing mounted in racks. For example, a rack can include servers, routers, disk arrays, and operational support components (e.g., power distribution components, fans, etc.). The racks usually provide a convenient and efficient way to arrange computing equipment in a centralized operation location. The configuration of the rack structures usually follow conventional standards. However, the equipment mounted within a rack can vary dramatically. Managing and maintaining the infrastructure to support numerous different pieces of equipment and possible applications in a large and complicated centralized resource environment for a variety of different clients raises many challenging operational issues. In addition, there are a variety of infrastructure support activities that can have a significant impact on rack equipment operation in a centralized resource location.

Traditional attempts at addressing the management and maintenance issues in conventional centralized resource centers are usually labor intensive and difficult. For example, some traditional attempts involve manually correlating numerous different types of information, including absolute maximum ratings defined by regulatory requirements of power supply vendors, amount of current flowing through a branch circuit, manual partial configuration of rack equipment, impacts of partial configuration on performance, local environmental conditions, cost of maintaining power and thermal envelopes, and economic value of computing services running on the rack equipment. Collecting, correlating, and analyzing this information manually is labor intensive and requires a significant level of specialized knowledge and expertise.

Attempting to manually address problems that can arise is often complicated and complex. The sheer number of different possible characteristics of the different pieces of rack equipment and rack support equipment presents daunting manual tracking and organizing issues. This is further complicated by the variety of possible performance settings that each piece of rack equipment and support equipment may be capable of. For example, conventional attempts usually have difficulty adjusting performance with respect to power consumption and thermal loading characteristics since the performance levels of centralized processing related equipment are typically fixed.

Even if a traditional rack equipment adjustment decision is made, implementing the adjustments manually is also typically resource intensive. Manually adjusting the rack equipment usually requires the operator to have knowledge and understanding of unique features of each piece of equipment. The traditional response time is also often slow when compared to the speed at which processing operations occur and/or change in the rack equipment. Traditional manual attempts at speeding up the adjustments in an environment with a variety of numerous different pieces of rack equipment tends to increase the probability of human error in making the adjustments.

SUMMARY OF THE INVENTION

A rack equipment management system and method for providing a convenient and efficient manner to automatically manage rack equipment associated with information processing based upon power consumption and heat dissipation policies is presented. In one embodiment of the present invention, a rack equipment management system includes rack equipment, a management component, and a communication bus. The rack equipment participates in information processing activities. The management component manages power consumption and thermal load of the rack equipment. The communication bus communicatively couples the rack equipment and the management component.

BRIEF DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood the present invention may be practiced without these specific details. In other instances, some readily understood methods, procedures, components, and circuits have not been described in detail as not to unnecessarily obscure aspects of the current invention.

The present invention facilitates convenient and efficient operational management of rack equipment utilized to process information. A present invention rack equipment management system and method controls detection and manipulation of rack equipment operating characteristics and activities. In one embodiment, a present invention rack equipment management system and method establishes a communication link and protocol for performing automatic retrieval of rack equipment information and dynamic configuration of rack equipment and/or support equipment performance levels. For example, the protocol can provide retrieval of rack equipment information on available power dissipation and thermal operating levels or points (e.g., from a local store in the rack equipment itself), and in turn direct a piece of rack equipment to operate at one of the available level or points. The present invention rack equipment management system and method also provides an interface that presents disparate information in a unified manner and facilitates adjustments in rack equipment operating settings and performance levels.

Figure 1:
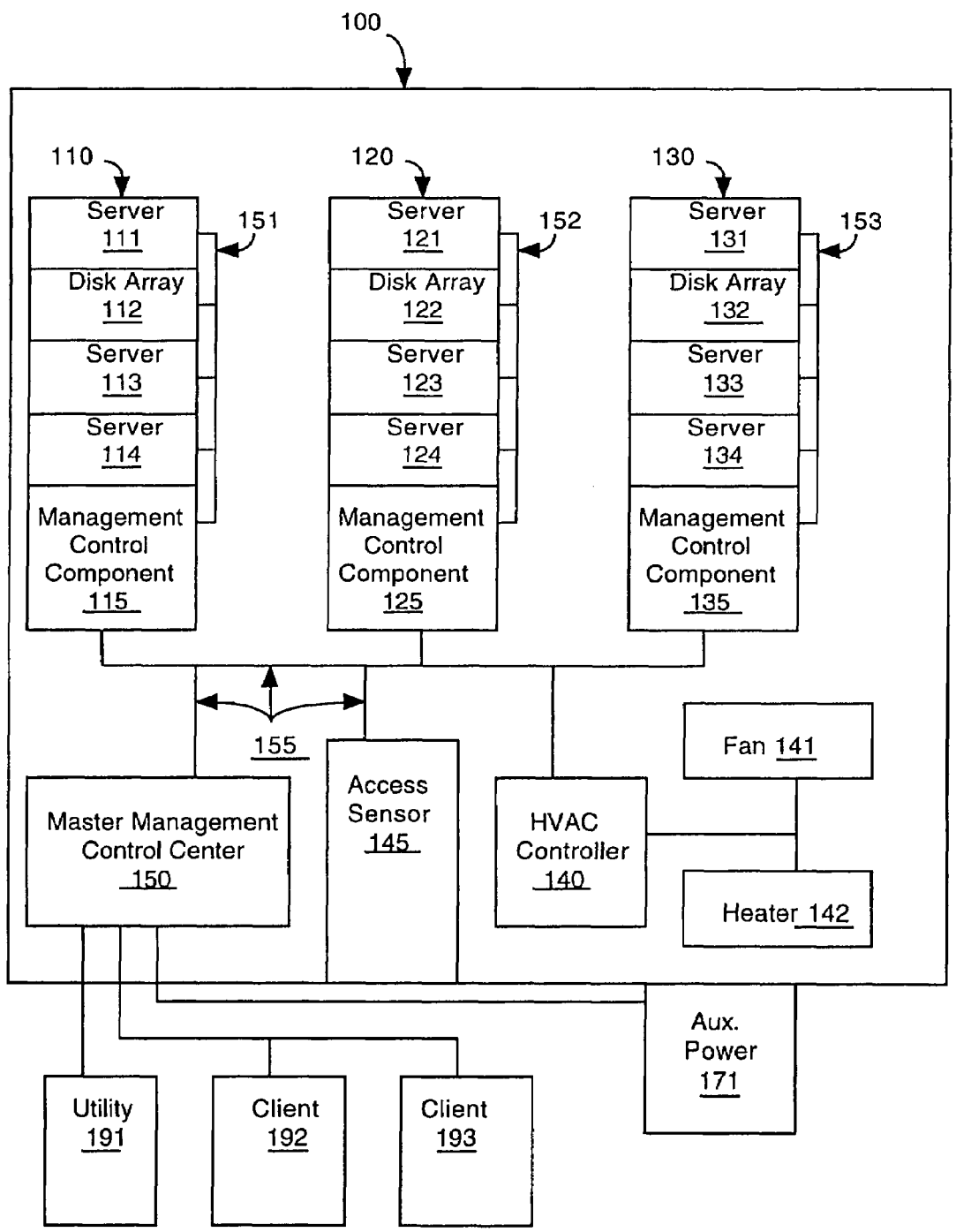
FIG. 1 is an illustration of a rack equipment management system in accordance with one embodiment of the present invention

FIG. 1 is an illustration of rack equipment management system 100, one embodiment of the present invention. Equipment management system 100 includes a plurality of racks 110, 120, and 130, master management control center 150, access sensor 145, and heating, venting and cooling (HVAC) controller 140. Equipment racks 110, 120 and 130 comprise servers 111 through 134, disk arrays 112, 122 and 132, and management control units 115, 125 and 135 respectively. Master management control center 150 is communicatively coupled to equipment racks 110, 120, and 130, access sensor 145, and HVAC controller 140 through communication channel or link 155.

The components of rack equipment management system 100 cooperatively operate to process information and manage equipment included in rack equipment management system 100. The plurality of servers 111 through 134 process information. Disk arrays 112, 122 and 132 store information for processing. Management control components 115, 125 and 135 manage the equipment included in equipment racks 110, 120, and 130 in accordance with a rack equipment management plan. Master management control center 150 coordinates the management of equipment between racks 110, 120 and 130 and manages equipment (e.g., HVAC controller 140) that supports operations of multiple racks in accordance with the rack equipment management plan. Master management control center 150 also receives equipment rack policy related information from power utility 191 and information processing clients 192 and 193. Access sensor 145 senses when someone enters or leaves the area in which rack equipment management system 100 is located and notifies master management control center 150. HVAC controller 140 controls the heating, venting and cooling equipment associated with an area in which equipment racks 110, 120 and 130 are located. For example, HVAC controller 140 controls fan 141, heater 142 and an air conditioning unit (not shown) that vent, heat, and cool the area (e.g., a room) in which equipment racks 110, 120 and 130 are located.

The communication links included in rack equipment management system 100 communicate information between components of rack equipment management system 100. Communication link 151 communicatively couples management control component 115 to other equipment (e.g., server 111, 113 and 114 and disk array 112) in rack 110 (e.g., server 111, 113 and 114 and disk array 112). Communication link 152 communicatively couples management control component 125 to other equipment in rack 120. Communication link 153 communicatively couples management control component 135 to other equipment in rack 130. Communication link 155 communicatively couples master management control center 150, management control components 115, 125, and 135, access sensor 145 and HVAC controller 140.

There are a variety of configurations that are compatible with present invention communication links. The communication links can be aggregated at a rack or aisle level and can be a shared link. A present invention communication link can be established by "injecting" (e.g., modulating) a signal on a power cord (e.g., AC or DC line cord). In one exemplary implementation, these communication links are available as soon as the rack equipment is coupled to the power cable and capable of receiving power. A present invention communication link can also be implemented in a system with highly available links, including systems with line cord redundancy. The communication links can also be implemented on other network and/or communication systems, including an RS-485 system, an Ethernet10/100/100bT local area network (LAN), and/or Wireless Communications Channels.

Management control components 115, 125, 135 and master management control component 150 manage rack equipment and rack area support equipment in accordance with policies and objectives of a rack equipment management plan. The rack equipment management plan includes policies which dictate management objectives for rack equipment processing and operations. The management control components analyze the policy information in conjunction with equipment description information to formulate commands which direct actions on the equipment in racks 110, 120 and 130 and related support equipment. For example, the commands can direct modulation of operation settings and performance levels of the rack equipment.

With reference still to FIG. 1, there are a variety of ways in which master management control center 150 and management control components 115, 125 and 135 manage equipment included in rack equipment management system 100. For example, management control components 115, 125 and 135 can direct adjustments in the frequency and operating voltage characteristics of equipment included in racks 110 through 130 respectively. Management control components 115, 125 and 135 can also instruct equipment included in racks 110 through 130 respectively to turn on or off. Alternatively management control components 115, 125 and 135 can instruct execution components (e.g., parallel processors, pipelines, etc.) and/or portions of a memory component (e.g., a disk array, etc.) to turn on or off. Master management control center 150 and management control components 115, 125 and 135 can also direct adjustments for support equipment (e.g., fan 141, heater 142, auxiliary power unit 171, etc.).

A present invention management control component can also include an interface for permitting observation and interaction with rack equipment management activities. The interface can provide a mechanism for information to be communicated to and from an operator or user in a convenient and user friendly manner. For example, convenient presentation provides divergent complicated information in an easily assimilated and understood display. The interface can also allow specification or entry of rack equipment policies. The interface also allows operators or other equipment (e.g., remote resources coupled via a network) to query and optionally set operational settings and/or performance levels. For example, an authorized operator or user can override actions dictated by a particular policy by interacting with the interface and the management control component automatically directs corresponding changes in the rack equipment operational settings and/or performance levels.

Figure 2:
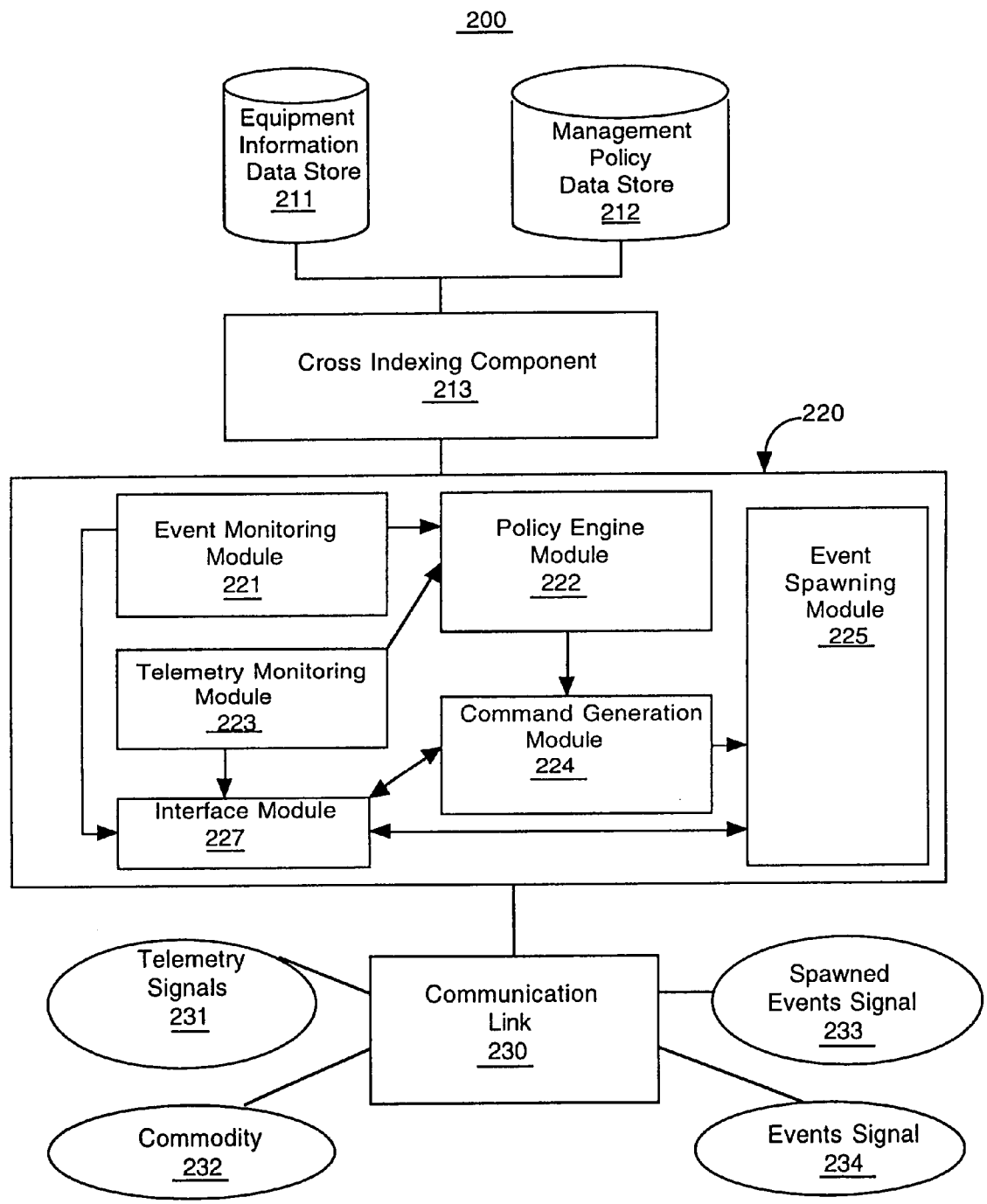
FIG. 2 is an illustration of one embodiment of a present invention management control component.

FIG. 2 is an illustration of management control component 200, one embodiment of a present invention management control component. Management control component 200 includes rack equipment information data store 211, rack equipment management policy data store 212, cross indexing component 213, management processing component 220, and communication component 230. The components of management control component 200 cooperatively operate to manage rack equipment operations based upon a rack equipment management plan. Equipment information data store 211 stores information about equipment included in the rack (e.g., rack equipment description information). Rack equipment management policy data store 212 stores information on management plans (e.g., policy guidelines and management plan objectives). Cross indexing component 213 correlates equipment information and rack equipment management plan information. Management processing component 220 processes instructions for controlling activities associated with rack equipment performance in accordance with a rack equipment management plan. Management control component 200 utilizes communication link 230 for external communications. For example, management control component 200 utilizes communication link 230 to forward and receive telemetry signals 231, commodity signals 232, spawned event signals 233 and trigger event signals 234.

The information storage features of management control component 200 are readily adaptable for a variety of information storage configurations. Equipment information data store 211 stores information associated with features and characteristics of equipment controlled and managed by management control component 200. In one exemplary implementation, equipment information data store 211 stores information indicating possible operation settings of rack equipment and can also store system specific information on how the various operating levels can be achieved (e.g., commands to issue to the equipment to direct implementation of a operational setting and/or performance level). Management policy data store 212 stores management policy information associated with a rack equipment management plan. The management policy information can provide a correlation between a trigger event monitored by event monitoring module 221 and a rack equipment management objective and include an indication of a performance level change and/or another management event to spawn. Cross indexing component 213 provides a cross index or correlation of information included in the equipment information data store 211 and information included in management policy data store 212.

In one embodiment, management processing component 220 includes event monitoring module 221, policy engine module 222, telemetry collection module 223, command generation module 224, event spawning module 225 and management interface module 227. Event monitoring module 221 monitors the occurrence of trigger events. Policy review engine module 222 extracts and coordinates the objectives a management policy associates with a triggering event. Command generation module 224 generates performance adjustment commands corresponding to the management plan or policy objectives. Telemetry examination module 223 directs examination of telemetry measurements (e.g., characteristics and activity of rack equipment), including confirming compliance with performance adjustment commands. Event spawning module 225 generates rack equipment management events. Management interface module 227 executes interface operations.

Event monitoring module 221 can monitor a variety of different rack equipment events. If event monitoring module 221 detects a rack equipment triggering event, event monitoring module 221 sends an indication of the event detection to policy engine module 222 for analysis and processing. For example, event monitoring module 221 can detect indications of variations in power consumption and thermal characteristics of a rack equipment load and forwards notification of the event detection to policy engine module 222. Event monitoring module 221 can receive information from telemetry collection module 223 and can determine if the telemetry information indicates the occurrence of a triggering event (e.g., related to a policy action and/or management objective).

Policy engine module 222 can investigate a variety of different rack equipment management plan objectives in response to a triggering event indication. The policy engine module 222 can determine appropriate actions for implementing the management plan objectives. For example, the policy engine module 222 can determine if the occurrence of a particular rack management event (e.g., detected by event monitoring module 221) gives rise to a policy dictated change in a performance level (e.g., the power consumption and heat dissipation setting) of a particular piece of rack equipment. The policy engine module 222 can also determine if actions are limited by policy constraints. For example, policy engine module 222 can determine if a power consumption and heat dissipation budget limit management plan objective actions contradict or limit each other. The policy engine module 222 provides an indication of the action (e.g., a performance level modification) to command generation module 224.

Telemetry collection module 223 can be utilized to direct the collection of telemetry information associated with various different rack equipment. For example, telemetry collection module 223 is readily adaptable for utilization with different information processing related devices, including different types and brands of servers, routers, network equipment, uninterruptible power supplies and disk arrays. Telemetry collection module 223 is also readily adaptable for utilization with a variety of different rack equipment operation support devices, including HVAC controllers and auxiliary power supplies. Telemetry collection module 223 can also direct collection or retrieval of information for confirming performance adjustment commands are complied with. Telemetry module 223 can also direct retrieval of rack equipment description information (e.g., rack equipment operation settings and performance levels).

Command generation module 224 is capable of generating a variety of different commands in response to action indications received from policy engine module 222. Command generation module 224 can extract command protocol and syntax requirements from rack equipment description information (e.g., included in a rack equipment data store). The commands can direct a change in rack equipment and/or support equipment performance levels. For example, the commands can direct a change in a power consumption setting and/or heat dissipation level for the rack equipment. The commands can include a command to change the operating frequency of rack equipment and or voltage of supply power to rack equipment, turn on/off an execution component within rack equipment, and adjust support equipment (e.g., fan 141, heater 142, auxiliary power unit 171, etc.).

Event spawning module 225 spawns management events. Event spawning module 225 can spawn a triggering event that causes a management control component to interface with other management control components and/or rack equipment under the control of other management control components, clients, and/or external support operations (e.g., a power utility). For example, master management component 150 can receive indications of a management triggering event from utility 191 client 192 and/or client 193 and spawn a triggering event indication to management control component 115, 125 and/or 135. Conversely, management control components 115, 125 and 135 can spawn a triggering event requesting more power that causes master management control center 150 to start up auxiliary power 171 in accordance with a predetermined management policy.

In one embodiment of the present invention, a management control component (e.g., 115) is included in an intelligent power distribution unit (IPDU). The IPDU can be utilized to aggregate multiple power line cords from rack equipment into a smaller number of power line cords at a rack level. In an implementation in which power cords are used as a present invention communication link, the presence of each piece of rack equipment can be detected as the rack equipment is communicatively coupled to the IDPU. In addition, information associated with the piece of rack equipment (e.g., power and thermal performance operating points, information indicating the type of rack equipment, characteristics of the rack equipment, etc.) can be automatically communicated to the IPDU. Even if a piece of rack equipment does not have an available relevant descriptive information store itself, the IPDU can sense current draw and account for unregulated use in equipment rack management policy decisions.

Figure 3:
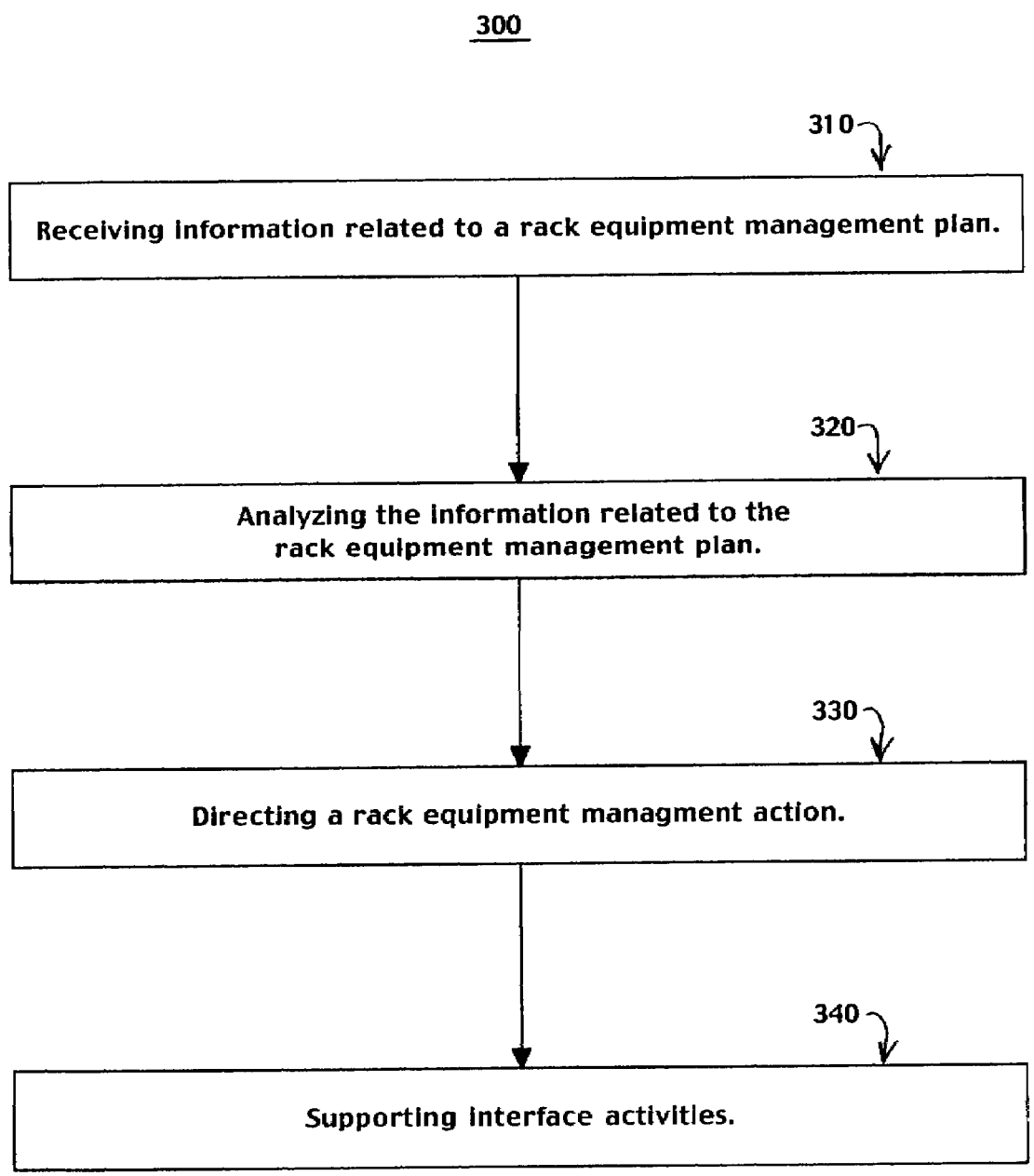
FIG. 3 is a flow chart of a rack equipment management method in accordance with one embodiment of the present invention.

FIG. 3 is a flow chart of rack equipment management method 300, a rack equipment management method in accordance with one embodiment of the present invention. Rack equipment management method 300 establishes a communication and control protocol for automatic retrieval of rack equipment management information. The communication and control protocol also facilitates manipulation of rack equipment operation and performance in accordance with a rack equipment management plan or policies. Rack equipment management method 300 also provides an interface for presenting information in a convenient manner to a user.

In step 310, information related to a rack equipment management plan is received. The information can include an indication of a rack equipment management plan trigger event. For example, the information can include an indication of a variation in the power consumption or thermal load of rack equipment. The information received in step 320 can include rack equipment description information and/or information related to rack equipment support operations (e.g., a notification of an alteration in rack equipment performance or settings can be received.) The information can also include an indication of the amount of current flowing through a circuit and/or an indication of a change in a power utility supply commodity characteristic (e.g., price, availability, etc).

The information related to the rack equipment management plan is analyzed in step 320. In one implementation, the analysis determines the association of the information received in step 310 to a rack equipment management action set forth in a rack equipment management plan for a particular trigger event indicated by information received in step 310. For example, the analysis can include determining changes for power consumption and/or heat dissipation characteristics of a piece of rack equipment. The analysis can also determine particular rack equipment management actions available for a particular piece of rack equipment. For example, possible operation setting and/or performance level changes.

At step 330, a rack equipment management action is directed. The rack equipment management action corresponds to the analysis performed in step 320. For example, manipulation of a performance level associated with power consumption and thermal load of the rack equipment is directed. The directions can also ensure particular performance levels that cause the piece of equipment to consume more power and/or dissipate more heat than is permitted by a rack power and thermal budget are not implemented. The manipulation can include instructions to adjust a frequency and a voltage of the rack equipment. In another example, the manipulation can include turning on and off the rack equipment. The directing can also include issuing a command to manipulate operation of equipment associated with supporting the rack equipment operations (e.g., HVAC equipment).

In step 340, interface activities are supported. The interface activities include presenting information in a convenient and user friendly manner. For example, rack equipment management plan information, corresponding rack equipment description information and telemetry information (e.g., operating level settings) can be displayed. Similar information associated with rack support equipment (e.g., HVAC equipment, auxiliary power, etc.) can also be presented. The interface activities can also include support for automatic adjustment of rack equipment management plan policies. For example, a client can automatically engage in a rack equipment policy adjustment protocol in which the client agrees to altered terms of service agreement and corresponding changes are made in a rack equipment management policy.

Figure 4:
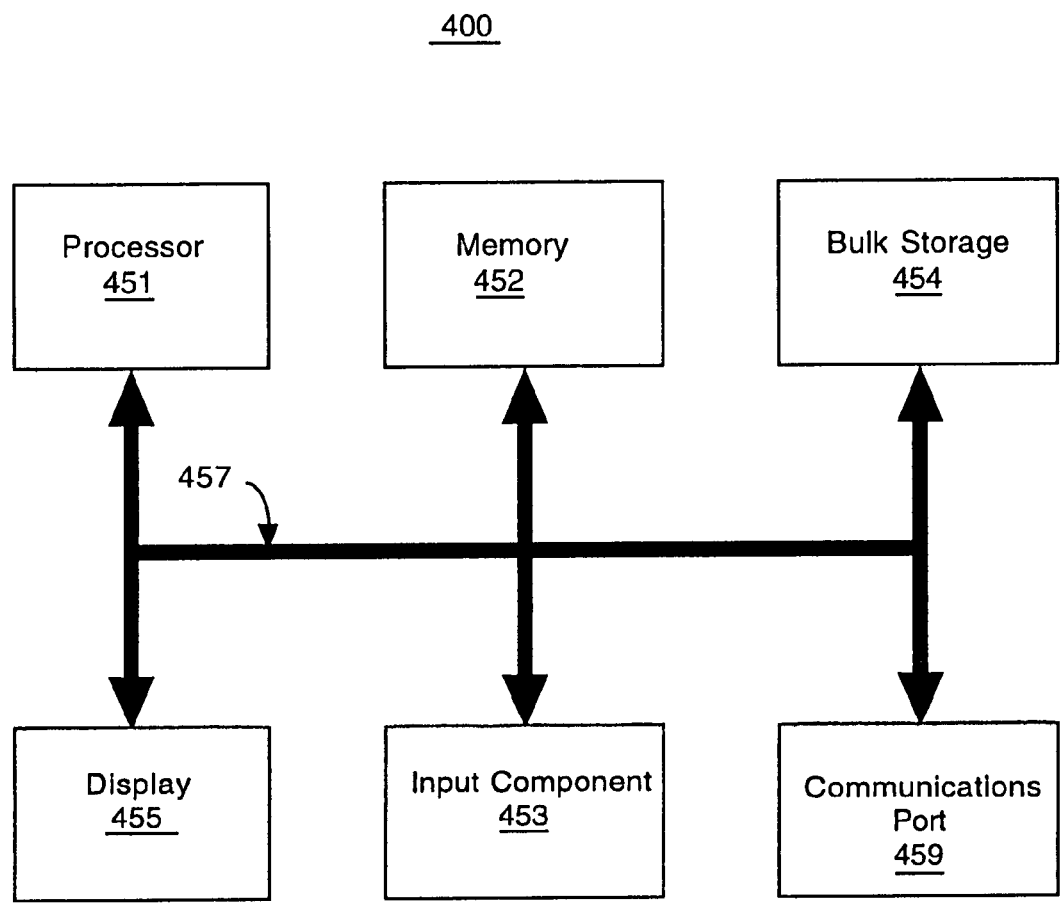
FIG. 4 is a block diagram of one embodiment of a computer system on which the present invention can be implemented.

FIG. 4 is a block diagram of computer system 400, one embodiment of a computer system on which the present invention can be implemented. For example, computer system 400 can be utilized to implement management processing component 220 or rack equipment management method 300. Computer system 400 can be mounted in a rack and also direct control of its own power consumption and thermal dissipation. Computer system 400 includes communication bus 457, processor 451, memory 452, input component 453, bulk storage component 454 (e.g., a disk drive), network communication port 459 and display module 455. Communication bus 457 is coupled to central processor 451, memory 452, input component 453, bulk storage component 454, network communication port 459 and display module 455.

The components of computer system 400 cooperatively function to provide a variety of functions, including performing rack equipment management in accordance with the present invention. Communication bus 457 communicates equipment rack management related information within computer system 400. Processor 451 processes information and instructions, including instructions and information for managing rack equipment (e.g., processor 451 processes event monitoring module 221 instructions, policy engine module 222 instructions, telemetry collection module 223 instructions, command generation module 224 instructions, etc.). Memory 452 stores information and instructions, including instructions for implementing a rack equipment management plan. Bulk storage component 454 also provides storage of information (e.g., rack equipment description information, policy information, etc.). One embodiment of a present interface can be implemented by input component 453, display module 455 and network communications port 459. Input component 453 facilitates communication of information (e.g., operator policy initiated changes, operator entered rack equipment description information, operator intervention in management actions, etc.) to computer system 400. Display module 455 displays information to a user (e.g., a graphical user interface conveying rack equipment operation settings and performance levels, rack equipment description information, policy information, correlation between the information, etc.). Network communication port 459 provides a communication port for communicatively coupling with a network (e.g., for communicating with a client, a utility, a remote operator and/or control center, etc.).

Thus, a present invention rack equipment management system and method facilitates convenient and efficient management of information processing support activities based upon a rack equipment management plan. The rack equipment management plan permits automated implementation of rack equipment policies and associated management objectives. Automatic direction of equipment operation setting and performance level adjustments is provided to meet the rack equipment management objectives (e.g. power consumption and heat dissipation levels). Equipment description information, policy information and rack equipment management commands are automatically communicated via communication links implementing a rack equipment management protocol. The communication links are flexibly adaptive to a variety of implementations and can be implemented on an available communication medium (e.g., power cord lines). The present invention also provides a convenient and efficient interface. The interface can correlate diverse rack equipment management information in a unified manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various modifications as are suited to the particular use contemplated. It is intended that the scope of the invention be defined by the Claims appended hereto and their equivalents.

What is claimed is:

1. A rack equipment management system comprising:
   rack equipment for participating in information processing activities;
   a plurality of management components for managing power consumption and thermal load of said rack equipment;
   a management control center communicatively coupled to said plurality of management components for coordinating implementation of an equipment rack policy for power consumption and thermal load of said rack equipment, wherein said management control center receives equipment rack policy related information from information processing clients;
   a communication link for communicatively coupling said rack equipment and said plurality of management components, wherein said communication link communicates information between said plurality of management components and said rack equipment.

2. A rack equipment management system of claim 1 wherein said management component controls said power consumption and said thermal load of said rack equipment within a power consumption and heat dissipation budget.

3. A rack equipment management system of claim 1 further comprising an operator interface for presenting disparate information in a unified manner and facilitating adjustments in said rack equipment's operating settings and performance levels.

4. A rack equipment management system of claim 1 wherein said management component analyzes information communicated on said communications link and determines applicability of management plan policies to said information.

5. A rack equipment management system of claim 1 wherein said management component directs manipulation of said power consumption and said thermal load of said rack equipment in accordance with management plan policies.

6. A rack equipment management system of claim 1 wherein said management component is included in an intelligent power distribution unit, wherein said intelligent power distribution unit aggregates multiple power line cords from said rack equipment into a smaller number of power line cords at a rack level.

7. A rack equipment management system of claim 1 wherein said communication link communicates information compliant with a protocol permitting automatic configuration of power consumption and heat dissipation for said rack equipment.

8. A rack equipment management method comprising:
   receiving information related to a rack equipment management plan at a management control center via a communication link coupled to rack equipment, wherein said management control center receives equipment rack policy related information from information processing clients;
   analyzing policies of said rack equipment management plan associated with rack equipment operation at said management control center; and
   directing manipulation of power consumption and thermal load associated with said rack equipment from said management control center via a plurality of management components that are communicatively coupled to said rack equipment.

9. A rack equipment management method of claim 8 wherein said rack equipment is associated with information processing.

10. A rack equipment management method of claim 8 wherein directing includes issuing a command to manipulate operation of equipment associated with supporting said rack equipment operations.

11. A rack equipment management method of claim 8 wherein said manipulation includes instructions to adjust a frequency and a voltage of said rack equipment.

12. A rack equipment management rack equipment management method of claim 8 wherein said manipulation includes turning on and off said rack equipment.

13. A rack equipment management method of claim 8 automatically adjusting said rack equipment management plan interactively.

* * * * *

UNITED STATES PATENT AND TRADEMARK OFFICE
CERTIFICATE OF CORRECTION

| | | |
|---|---|---|
| PATENT NO. | : 7,363,516 B2 | |
| APPLICATION NO. | : 10/678657 | |
| DATED | : April 22, 2008 | |
| INVENTOR(S) | : Kirk Michael Bresniker et al. | |

It is certified that error appears in the above-identified patent and that said Letters Patent is hereby corrected as shown below:

On the Title page, in field (56), under "Foreign Patent Documents", in column 2, line 7, delete "JP    3076234    4/1991".

In column 4, lines 40-41, delete "Ethernet10/100/100bT" and insert -- Ethernet10/100/1000bT --, therefor.

In column 12, lines 1-2, in Claim 12, after "A rack equipment management" delete "rack equipment management".

Signed and Sealed this

Twenty-second Day of July, 2008

JON W. DUDAS
*Director of the United States Patent and Trademark Office*